US005485181A

United States Patent [19]

Convers

[11] Patent Number: 5,485,181

[45] Date of Patent: Jan. 16, 1996

[54] INK JET PRINTHEAD WITH IMPROVED DURABILITY

[75] Inventor: Ronald J. Convers, Towanda, Pa.

[73] Assignee: E. I. Du Pont de Nemours and Company, Wilmington, Del.

[21] Appl. No.: 245,409

[22] Filed: May 18, 1994

[51] Int. Cl.$^6$ .................................................... G01D 15/16

[52] U.S. Cl. ................................ 347/63; 347/71; 347/65; 156/60

[58] Field of Search ................................ 347/63, 64, 65, 347/71; 156/60

[56] References Cited

U.S. PATENT DOCUMENTS

| | | | |
|---|---|---|---|
| 3,617,411 | 11/1971 | Coutore | 156/307 |
| 4,509,063 | 4/1985 | Sugitani et al. | 346/140 R |
| 4,543,318 | 9/1985 | Maeda et al. | 430/288 |
| 4,572,888 | 2/1986 | Maeda et al. | 430/288 |
| 4,609,427 | 9/1986 | Inamoto et al. | 156/633 |
| 4,956,035 | 9/1990 | Sedlak | 156/664 |
| 5,019,483 | 5/1991 | Lin et al. | 430/288 |

*Primary Examiner*—Benjamin R. Fuller
*Assistant Examiner*—Valerie Ann Lund

[57] ABSTRACT

Durability of ink jet printheads is improved by employing certain sulfur-containing adhesion promoters between the photoresist intermediate layer and the top plate having a noble metal surface.

10 Claims, No Drawings

INK JET PRINTHEAD WITH IMPROVED DURABILITY

FIELD OF THE INVENTION

This invention relates to ink jet printheads, and, more particularly, to printheads having improved durability.

BACKGROUND OF THE INVENTION

Ink jet printheads are sandwich structures having a top plate, an intermediate photoresist layer, and a bottom plate. The photoresist layer is imaged to define ink passageways, which carry ink to outlet nozzles mounted on the top plate. The bottom plate typically is a thermally stable substrate, such as a silicon wafer, that bears microcircuits. Microresistors are mounted on the bottom plate, projecting into the liquid pathways in the photoresist layer, in alignment with the ink nozzles. At computer command, the resistors superheat nearby ink, creating a steam bubble that forces ink droplets out the nozzles.

The top plate frequently has a noble metal surface (typically gold) that is not wetted by the aqueous ink to minimize accumulation of residual ink during the firing cycle since ink accumulation may interfere with the design trajectory of the ink droplets. While noble metals may be desired for this purpose, it is difficult to achieve a durable bond between the noble metal and the photoresist layer during the millions of firing cycles the pen will experience during its lifetime.

SUMMARY OF THE INVENTION

It now has been found that a more durable bond will be formed between the top plate noble metal surface, and the intermediate photoresist layer, through use of an adhesion promoter having the formula:

$X(-R-Y)_n$ wherein

X is a thioether, disulfide, polysulfide, or sulfur-containing heterocycle group;

Y is a terminal group that reacts with the photoresist;

R is a flexible non-polar molecular group; and n is at least one.

DETAILED DESCRIPTION OF THE INVENTION

Details of printhead design are well known in the art, and will vary with the manufacturer. The present invention provides printheads having a bottom plate; an intermediate photoresist layer having ink passageways and reactive molecular groups chemically bound to its surface; a layer of an adhesion promoter; and a top plate having a noble metal surface.

Bottom Plate

The bottom plate bears microresistors or pressure generating elements, such as heat generating or piezo elements, that are connected to the source of electronic signals that drive the printhead. Suitable materials for the bottom plate include silicon wafers, glass, ceramics, plastic, or metals. Circuits mounted on the bottom plate may be protected from ink corrosion by sputter-coated "passivation" layers, such as $Si_3N_4$ and SiC, as described in U.S. Pat. Nos. 4,970,532 and 4,809,428. Other representative materials suitable for use as the passivation layer are $SiO_2$, $Ta_2O_5$, $Al_2O_3$, glass, BN, etc.

Photoresist Layer

The photoresist layer may be applied to the bottom plate as a liquid, using the squeegee method or other methods known in the art, or laminated to the bottom plate as a dry film. The photoresist layer contains a monomer, binder, and photoinitiator, and has reactive molecular groups on its surface that will react with the adhesion promoter to provide a durable bond with the top plate, as discussed hereinafter. The reactive groups may be epoxide, tertiary amino, aryldiazonium, or any other group that will survive the photocuring and development step whereby the photoresist layer is processed to contain ink passageways, and which will react with the adhesion promoter. Epoxide groups are preferred because they do not introduce unwanted polarity into the photoresist, thereby making the photoresist vulnerable to attack by the ink. Some particularly well-suited photoresist layers are disclosed in U.S. Pat. Nos. 4,937,172 and 5,073,062, incorporated herein by reference.

Thickness of the resin layer will vary with printhead design, but typically is in the range of 20 to 200 microns. The resin layer normally is imaged, to create the ink passageways, by exposure to actinic radiation through a target registered with the underlying microresistors. Collimated light is required to obtain channel walls perpendicular to the bottom plate. After exposure, a developing solvent is employed to remove exposed or unexposed regions of the photoresist, depending on the case, based on the difference in solubilities of those regions.

Adhesion Promoter

The adhesion promoter is preferably applied to the top plate, but may be applied to the developed photoresist layer, before these components are brought into contact in the fabrication process. The adhesion promoter has the formula:

$X(-R-Y)_n$ wherein

X is a thioether, disulfide, polysulfide, or sulfur-containing heterocycle group;

Y is a terminal group that reacts with the photoresist;

R is a flexible non-polar molecular group; and n is at least one.

Preferably, terminal group X contains more than one sulfur atom.

Flexible segment R is a linear aliphatic chain, or another flexible group known in the art, that is relatively unreactive with chemical groups on the photoresist layer surface. Group Y preferably forms a covalent bond with reactive molecule groups on the photoresist layer surface, and conveniently is an -OH, -NH, -SH, -COOH, carboxylic anhydride, reactive diene, reactive dienophile, or a reactive unsaturated moiety such as a styryl, acrylate, or methacrylate group. Selection of the particular Y group will depend on the reactive molecular group(s) present on the photoresist layer surface. For example, when the photoresist layer has epoxide groups on the surface, Y conveniently is an -OH, -NH, -SH, -COOH or carboxylic anhydride group, with -COOH and -NH groups being preferred.

Some suitable adhesion promoters include:

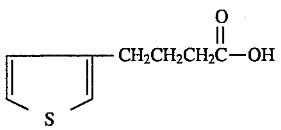

4-(2-thienyl)butyric acid

-continued

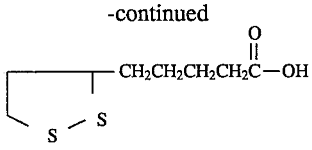

6, 8-dithiooctanoic acid $(-S\ (CH_2)_nCOOH)_2$ where n is at least 1,

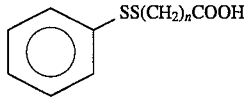

where n is at least 1,

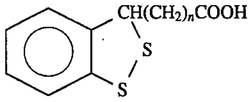

where n is at least 1,

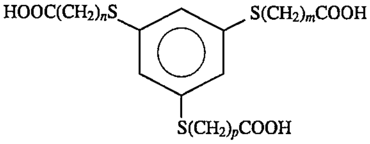

where m is at least 1, where n is at least 1, and where p is at least 1,

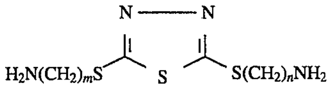

where m is at least 2, and where n is at least 2, 4-(2-Thienyl)butyric acid and 6,8-dithiooctanoic acid are preferred, and are both available from Aldrich Chemical company, Milwaukee, Wis..

The amount of adhesion promoter is highly dependent on the adhesion promoter selected, and the reactive group present on the surface of the resin layer. The adhesion promoter typically is applied at a rate of 3 to 100 mg/cm$^2$, preferably 3–50 mg/cm$^2$. Higher amounts may be needed when the promoter is added to the resin layer instead of the top plate.

TOP PLATE

The top plate is then bonded to the developed barrier material. The adhesion promoter may be applied to the top plate in a very thin uniform layer prior to bonding it to the resin layer or the top plate may be bonded to the adhesion promoter layer present on the resin layer. The top plate has a base plate and a surface layer of a noble metal. Some examples of noble metals include gold, platinum, palladium and iridium. Some examples of base plates include glass, ceramics, metal, plastics, thermoplastic resins such as acrylic resins, ABS resins, polyethylene and the like. Preferably the top plate is gold-surfaced.

PROCESS

Details on how these general steps are accomplished will vary with the specific printhead design and manufacturer. In one embodiment, a noble metal-surfaced top plate may be washed with a dilute solution of the adhesion-promoting compound to form a very thin layer, dried, aligned appropriately with features on the face of a bottom plate which bears printed microcircuits and an imaged and developed resin layer, and then bonded with the resist surface using heat and pressure. If more than a very thin, uniform coating is applied, deposits of adhesion promoter are formed which may interfere with the desired close contact of the resin layer to the noble metal surface, which is required if one end of an adhesion promoter molecule is to bond to the resist and the other end of the same molecule is to bond to the noble metal.

EXAMPLES

The following examples, wherein parts and percentages are by weight, illustrate but do not limit the invention.

EXAMPLE 1

Three approximately 2 cm×5 cm strips of a 30 micron thick coating of a photoresist or resin layer similar to that described in Example 7 of U.S. Pat. No. 4,937,172 on 0.92 mil (23.4 microns) polyethylene terphthalate film were given a UV photocure (75 mJ/cm$^2$) and then laminated to the gold-plated surface of three 5 cm×5 cm plates using a Riston® hot roll laminator set at 100° C., 40 psig, and 1 meter/minute. The gold-plated surface of the first plate had previously received no adhesion promoter treatment, whereas the gold-plated surface of the second plate had been previously briefly immersed in a 1 weight percent solution of 4-(2-thienyl)butyric acid (Aldrich Chemical Company, Milwaukee, Wis.) in ethyl acetate and air-dried at room temperature. The gold-plated surface of the third plate had been treated with a 1 weight percent solution of thioctic acid (Aldrich Chemical Company, Milwaukee, Wis.) in ethyl acetate and air-dried at room temperature. The resulting laminates were baked at 150° C. for 1 hour and cooled. The polyethylene terphthalate films were then peeled away and discarded. The resists were scored with a sharp knife in a cross-hatch pattern of approximately 5 mm×5 mm squares. Pieces of Scotch™ 810 tape were pressed firmly, with rubbing for 10 seconds, onto the cross-hatched surfaces of each of the three resists and then ripped away as quickly as possible from the resist surfaces. Again pieces of tape were pressed firmly, with rubbing for 10 seconds, onto the cross-hatched surfaces of the three resists and then ripped away as quickly as possible from the resist surfaces. If any resist was pulled away with the tape, the resist and/or the adhesion promoter were a failure. Failure tended to start with small chips of resist being removed by the tape from the edges of the cross-hatched cuts, i.e., a few percent of the resist-covered gold surface being re-exposed to view. Worse failure showed as larger areas of the resist-covered gold surface being re-exposed to view.

The sample having the untreated gold surface had only about 10–30 percent of the resist remaining on the gold surface after the tape test. With 4-(2-thienyl)butyric acid (Aldrich Chemical Company, Milwaukee, Wis.) as the adhesion promoter, no improvement was seen. However, with thioctic acid (Aldrich Chemical Company) as the adhesion promoter, no edge chipping occurred. The results show that not all adhesion promoters are equally effective and that the choice of adhesion promoter is dependant on the composition of the resin layer.

EXAMPLE 2

Example 1 was repeated with the following exceptions: a photoresist similar to that described in Example 10 of U.S.

Pat. No. 4,937,172 was used. The untreated sample showed better, but still insufficient gold adhesion with about 5 percent of the resist-covered gold surface being re-exposed to view in the tape test. Both 4-(2-thienyl)butyric acid and thioctic acid treated samples displayed no edge chipping in the tape test.

EXAMPLE 3

Example 2 was repeated with the following exceptions: a 0.10% solution of thioctic acid in ethyl acetate was used instead of a 1% solution. The untreated control sample showed about 1–2 percent of the resist-covered gold surface reexposed to view after the tape test. The samples with the thioctic acid treatment showed no edge chipping after the tape test.

What is claimed is:

1. In a printhead of an ink jet printer, said printhead comprising a top plate with a noble metal surface, an intermediate photoresist layer, and a bottom plate, the improvement wherein an adhesion promoter having the formula $X(\text{-}R\text{-}Y)_n$ wherein X is a thioether, disulfide, polysulfide, or sulfur-containing heterocycle group;

Y is a terminal group that reacts with the photoresist;

R is a flexible non-polar molecular group; and n is at least one;

is employed between said noble metal surface and said photoresist layer.

2. The printhead of claim 1 wherein the photoresist layer surface has epoxide reactive molecular groups.

3. The printhead of claim 2 wherein Y is selected from the group consisting of -OH, -NH, -SH, -COOH and carboxylic anhydride.

4. The printhead of claim 1 wherein said adhesion promoter is applied at a rate of approximately 3 to 100 mg/cm$^2$.

5. The printhead of claim 1 wherein n is greater than one.

6. The printhead of claim 1 wherein R is a linear aliphatic chain.

7. The printhead of claim 1 wherein Y forms a covalent bond with reactive molecular groups on the photoresist layer.

8. The printhead of claim 7 wherein Y is selected from the group consisting of -OH, -NH, -SH, -COOH, carboxylic anhydride, reactive diene or dienephile, and a reactive unsaturated moiety.

9. The printhead of claim 1 wherein the adhesion promoter is 4-(2-thienyl)butyric acid.

10. The printhead of claim 1 wherein the adhesion promoter is 6,8-dithiooctanoic acid.

* * * * *